(12) United States Patent
Edakunni et al.

(10) Patent No.: US 10,102,485 B2
(45) Date of Patent: Oct. 16, 2018

(54) METHOD AND SYSTEM FOR PREDICTING DEMAND FOR VEHICLES

(71) Applicant: Conduent Business Services, LLC, Dallas, TX (US)

(72) Inventors: Narayanan Unny Edakunni, Bangalore (IN); Aditi Raghunathan, Bangalore (IN)

(73) Assignee: Conduent Business Services, LLC, Dallas, TX (US)

( * ) Notice: Subject to any disclaimer, the term of this patent is extended or adjusted under 35 U.S.C. 154(b) by 532 days.

(21) Appl. No.: 14/608,246

(22) Filed: Jan. 29, 2015

(65) Prior Publication Data

US 2016/0225262 A1   Aug. 4, 2016

(51) Int. Cl.
  *G06Q 10/04* (2012.01)
  *G08G 1/00* (2006.01)
(52) U.S. Cl.
  CPC .................................... *G06Q 10/04* (2013.01)
(58) Field of Classification Search
  CPC ...... G01C 21/3492; G06N 5/04; G06N 5/048; G08G 1/123
  See application file for complete search history.

(56) References Cited

U.S. PATENT DOCUMENTS

2009/0043486 A1* 2/2009 Yang .................. G01C 21/3492
                                                               701/117
2009/0299563 A1* 12/2009 Mikosza .................. B60F 1/00
                                                               701/25
2013/0317884 A1* 11/2013 Chidlovskii ......... G06Q 10/063
                                                               705/7.31
2015/0308844 A1* 10/2015 Shimazaki ......... G01C 21/3492
                                                               701/465

OTHER PUBLICATIONS

U.S. Appl. No. 14/219,487, filed Mar. 19, 2014; Predicting Arrival Times of Vehicles Based Upon Observed Schedule Adherence; Abhishek Tripathi et al.
Erma Suryani, Shuo-Yan Chou, and Chih-Hsien Chen. Air passenger demand forecasting and passenger terminal capacity expansion: A system dynamics framework. Expert Systems with Applications, 2010.
R. Tibishirani. Regression shrinkage and selection via the lasso. 58, 1996.

* cited by examiner

Primary Examiner — Charles J Han
(74) Attorney, Agent, or Firm — Jones Robb, LLC

(57) ABSTRACT

The disclosed embodiments illustrate methods and systems for predicting demand of vehicles in a transportation network. The method includes determining demand events at each of one or more locations for time intervals based on historical demand data. The demand events correspond to a demand of vehicles at one or more locations during plurality of time intervals throughout a day. The method includes creating a graph comprising nodes, and edges connecting nodes, each node being representative of a demand event from demand events. An edge is representative of dependency between two demand events from demand events. The method includes predicting demand of vehicles at a location from one or more locations during a predetermined time interval based on the graph and a real time demand of vehicles associated with other demand event. The method includes displaying demand prediction on a computing device at one or more locations of transportation network.

14 Claims, 6 Drawing Sheets

METHOD AND SYSTEM FOR PREDICTING DEMAND FOR VEHICLES

TECHNICAL FIELD

The presently disclosed embodiments are related, in general, to transportation. More particularly, the presently disclosed embodiments are related to methods and systems for predicting demand for vehicles in a transportation network.

BACKGROUND

Public transportation is a safe, a cheap, and a sustainable mode of transportation in most cities and towns all around the world. Adoption and utilization of public transportation by the public usually depends on the operational efficiency of public transportation system. Further, the efficiency of running a transportation system in a city depends at least on matching of the resources (e.g., bus, train, tram, etc.) to the demand of vehicles at various stops/nodes. However, prediction of the demand of the resources at various stops/nodes may be a cumbersome task.

SUMMARY

According to embodiments illustrated herein, there is provided a method for predicting demand of one or more vehicles in a transportation network. The method includes determining one or more demand events at each of one or more locations for one or more time intervals based on a historical demand data associated with each of said one or more locations. The one or more demand events correspond to a demand of said one or more vehicles at said one or more locations during plurality of time intervals throughout a day. The method further includes creating a graph comprising one or more nodes, and one or more edges connecting said one or more nodes, each node being representative of a demand event from said one or more demand events. An edge is representative of a dependency between two demand events from said one or more demand events. Further, the method includes predicting said demand of said one or more vehicles at a location from said one or more locations during a predetermined time interval based on said created graph and a real time demand of said one or more vehicles associated with at least one other demand event. Thereafter, the method includes displaying, by a display device, said demand prediction on a computing device at said one or more locations of said transportation network. The method is performed by one or more microprocessors.

According to embodiments illustrated herein, there is provided a method for deploying one or more public transit vehicles in a public transit network. The method includes determining one or more demand events at each of one or more public transit nodes for one or more time intervals based on a historical demand data associated with each of said one or more public transit nodes. The one or more demand events correspond to a demand of said one or more public transit vehicles at said one or more public transit nodes during plurality of time intervals throughout a day. Further, the historical demand data comprises at least a data pertaining to a sale of one or more tickets for said one or more public transit vehicles at said one or more public transit nodes for said one or more time intervals. The method further includes creating a graph comprising one or more nodes, and one or more edges connecting said one or more nodes, each node being representative of a demand event from said one or more demand events. An edge is representative of a dependency between two demand events from said one or more demand events. Further, the method includes assigning weights to said one or more edges of said graph based on a strength of said dependency between two respective demand events. The method further includes predicting said demand of said one or more public transit vehicles at a public transit node from said one or more public transit nodes during a predetermined time interval based on said created graph and a real time demand of said one or more public transit vehicles associated with at least one demand event. Thereafter, the method further includes deploying said one or more public transit vehicles at said public transit node to meet said predicted demand. The method is performed by one or more microprocessors.

According to embodiments illustrated herein, there is provided a system for predicting demand of one or more vehicles in a transportation network. The system includes one or more microprocessors configured to determine one or more demand events at each of one or more locations for one or more time intervals based on a historical demand data associated with each of said one or more locations. The one or more demand events correspond to a demand of said one or more vehicles at said one or more locations during plurality of time intervals throughout a day. The one or more microprocessors configured to create a graph comprising one or more nodes, and one or more edges connecting said one or more nodes, each node being representative of a demand event from said one or more demand events. An edge is representative of a dependency between two demand events from said one or more demand events. The one or more microprocessors are further configured to predict said demand of said one or more vehicles at a location from said one or more locations during a predetermined time interval based on said created graph and a real time demand of said one or more vehicles associated with at least one demand event. A display device is further configured to display said demand prediction on a computing device at said one or more locations of said transportation network.

According to embodiments illustrated herein, there is provided a computer program product for use with a computer, the computer program product comprising a non-transitory computer readable medium. The non-transitory computer readable medium stores a computer program code for predicting demand of one or more vehicles in a transportation network. The computer program code is executable by one or more microprocessors to determine one or more demand events at each of one or more locations for one or more time intervals based on a historical demand data associated with each of said one or more locations. The one or more demand events correspond to a demand of said one or more vehicles at said one or more locations during plurality of time intervals throughout a day. The computer program code is further executable by the one or more microprocessors to create a graph comprising one or more nodes, and one or more edges connecting said one or more nodes, each node being representative of a demand event from said one or more demand events. An edge is representative of a dependency between two demand events from said one or more demand events. The computer program code is further executable by the one or more microprocessors to predict said demand of said one or more vehicles at a location from said one or more locations during a predetermined time interval based on said created graph and a real time demand of said one or more vehicles associated with at least one demand event. Thereafter, the computer program code is executable by a display device to display said demand prediction on a computing device at said one or more locations of said transportation network.

BRIEF DESCRIPTION OF DRAWINGS

The accompanying drawings illustrate the various embodiments of systems, methods, and other aspects of the disclosure. Any person with ordinary skills in the art will appreciate that the illustrated element boundaries (e.g., boxes, groups of boxes, or other shapes) in the figures represent one example of the boundaries. In some examples, one element may be designed as multiple elements, or multiple elements may be designed as one element. In some examples, an element shown as an internal component of one element may be implemented as an external component in another, and vice versa. Furthermore, the elements may not be drawn to scale.

Various embodiments will hereinafter be described in accordance with the appended drawings, which are provided to illustrate the scope and not to limit it in any manner, wherein like designations denote similar elements, and in which.

DETAILED DESCRIPTION

Figure 1:
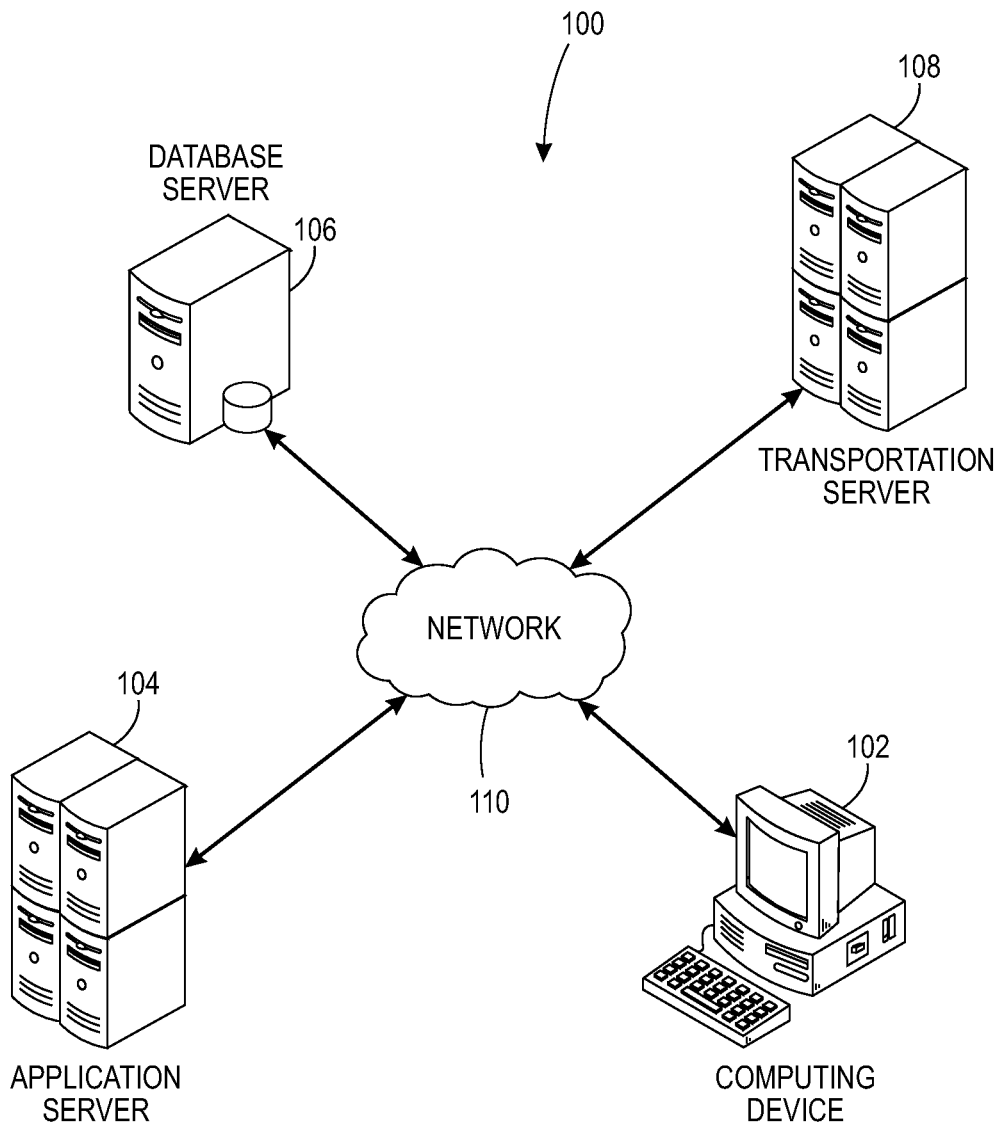
FIG. 1 is a block diagram of a system environment, in which various embodiments can be implemented.

The present disclosure is best understood with reference to the detailed figures and description set forth herein. Various embodiments are discussed below with reference to the figures. However, those skilled in the art will readily appreciate that the detailed descriptions given herein with respect to the figures are simply for explanatory purposes as the methods and systems may extend beyond the described embodiments. For example, the teachings presented and the needs of a particular application may yield multiple alternative and suitable approaches to implement the functionality of any detail described herein. Therefore, any approach may extend beyond the particular implementation choices in the following embodiments described and shown.

References to "one embodiment", "at least one embodiment", "an embodiment", "one example", "an example", "for example", and so on, indicate that the embodiment(s) or example(s) may include a particular feature, structure, characteristic, property, element, or limitation, but that not every embodiment or example necessarily includes that particular feature, structure, characteristic, property, element, or limitation. Furthermore, repeated use of the phrase "in an embodiment" does not necessarily refer to the same embodiment.

Definitions

The following terms shall have, for the purposes of this application, the meanings set forth below.

A "Computing device" refers to a device that includes one or more processors/microcontrollers and/or any other electronic components, or a device or a system that performs one or more operations according to one or more programming instructions/codes. Examples of the computing device may include, but are not limited to, a desktop computer, a laptop, a personal digital assistant (PDA), a mobile device, a Smartphone, a tablet computer (e.g., iPad®, and Samsung Galaxy Tab®), and the like.

"Demand events" refer to a demand of one or more vehicles at one or more locations during a plurality of time intervals throughout a day. In an embodiment, the demand event may be determined based at least on the sale of tickets for the one or more vehicles at the one or more locations during the plurality of time intervals throughout the day.

"Historical demand data" refers to a statistical data pertaining to the demand for one or more vehicles observed at one or more locations during a plurality of time intervals throughout the day. In an embodiment, the historical demand data may at least include data pertaining to a sale of one or more tickets for one or more vehicles at one or more locations for the plurality of time intervals.

A "graph" refers to a representation of one or more demand events as one or more nodes. Further, the graph may include one or more edges connecting the one or more nodes. The one or more edges may represent a dependency between two demand events from the one or more demand events.

"Demand" refers to a requirement of one or more vehicles at one or more locations during a plurality of time intervals throughout a day. In an embodiment, the demand may represent a relationship between a required number of vehicles and a number of passengers who purchased tickets for traveling in the vehicles. For example, a vehicle accommodates 20 passengers and number of passengers are 100. Based on the demand, the microprocessor may employ "5" vehicles in order to accommodate the number of passengers.

"Dependency" refers to a relation between two demand events from the one or more demand events. In an embodiment, the dependency may be determined based on a dependency of a target demand event with other demand events that chronologically precede the target demand. For example, if in an embodiment, demand events 1, 2, 3 precede a demand event 4 in time, then the dependency is the relation that maps demand values of the demand events 1, 2, 3 to demand value of the demand event 4.

"Weight" refers to a strength of a dependency between demand events. In an embodiment, the weights on the one or more edges of the graph may be assigned to predict the demand of the one or more vehicles in the transportation network.

"Real time demand" refers to a live demand that is observed at a location during a predetermined time interval. In an embodiment, the observed demand may be utilized to predict other demand events that may correspond to the same location (for which the real time demand was observed) or a second location different from the same location.

FIG. 1 is a block diagram of a system environment 100, in which various embodiments can be implemented. The system environment 100 includes a computing device 102, an application server 104, a database server 106, a transportation server 108, and a network 110.

The computing device 102 refers to a device at one or more locations of a transportation network. In an embodiment, the computing device 102 includes one or more processors, and one or more memories that are used to store instructions that are executable by the processor to perform predetermined operations. In an embodiment, the computing device 102 may correspond to a ticketing system that may be used for allotting tickets of vehicles to the one or more passengers. Such ticketing system may be installed at each of the one or more locations. Further, the ticketing system may be automatic or manually operated. In a scenario, where the ticketing system is manually operated, a user may be associated with the computing device 102. The ticketing system may include, but is not limited to a built-in ticketing system or a customized ticketing system. The computing device 102 may maintain a log of a count of a sale of tickets. Further, each record of the sale of tickets may be time stamped. Based on the timestamp associated with each sale of a ticket, the computing device 102 may determine a count of sale of tickets during a plurality of time intervals throughout the day. The count of sale of tickets during a time interval corresponds to a demand event. The computing device 102 may transmit the demand event data (i.e., count of sale of tickets during the plurality of time intervals) to the application server 104. In an embodiment, the user may receive demand prediction on a display device associated with the computing device 102. The computing device 102 may include a variety of computing devices such as, but not limited to, a laptop, a personal digital assistant (PDA), a tablet computer, a smartphone, a phablet, and the like.

The application server 104 refers to a computing device configured to predict demand of one or more vehicles in a transportation network. In an embodiment, the application server 104 may receive information pertaining to the one or more demand events from the computing device 102. In an embodiment, the application server 104 may store the received information as the historical demand data on the database server 106. Based on the historical demand data, the application server 104 may determine a dependency between the one or more demand events (in the historical demand data). Further, the application server 104 may determine a degree of dependency (hereinafter referred as weights) between the one or more nodes. Thereafter, the application server 104 may generate a graph comprising one or more nodes and one or more edges connecting the one or more nodes. Each of the one or more nodes represents one or more demand events. The one or more edges represent the dependency between the one or more nodes. The application server 104 may assign weights to the one or more edges. Based on the created graph and a real time demand (obtained from computing device 102), the application server 104 may predict the demand of the one or more vehicles at one or more locations during the plurality of time intervals. The creation of the graph and the prediction of the demand events has been described later in conjunction with FIG. 3, and FIG. 4.

In an embodiment, the application server 104 may instruct one or more transport authorities to deploy/remove one or more public transit vehicles in the public transit network in order to meet the modified/predicted demand. In an embodiment, the application server 104 may transmit the information pertaining to the predicted demand to the transport authority server 108.

The application server 104 may be realized through various types of application servers such as, but not limited to, Java application server, .NET framework application server, and Base4 application server.

The database server 106 may refer to a device or a computer that stores the historical demand data. The historical demand data may at least include data pertaining to a sale of one or more tickets for the one or more vehicles at the one or more locations for the plurality of time intervals. In an embodiment, the database server 106 may receive a query from the application server 104 to extract/update the historical demand data. The database server 106 may be realized through various technologies such as, but not limited to, Microsoft® SQL server, Oracle, and My SQL. In an embodiment, the application server 104 may connect to the database server 106 using one or more protocols such as, but not limited to, Open Database Connectivity (ODBC) protocol and Java Database Connectivity (JDBC) protocol. The database server 106 may be implemented using technologies including, but not limited to, Oracle®, IBM DB2®, Microsoft SQL Server®, Microsoft Access®, PostgreSQL®, MySQL® and SQLite®, and the like.

A person with ordinary skill in the art would understand that the scope of the disclosure is not limited to the database server 106 as a separate entity. In an embodiment, the functionalities of the database server 106 can be integrated into the application server 104.

The transportation server 108 refers to a computing device that comprises one or more processors and a memory device. The transportation server 108 may receive the predicted demand of the one or more vehicles from the application server 104. In an embodiment, the predicted demand may correspond to the vehicles required at a location during a predetermined time interval. On receiving the predicted demand, the transportation server 108 may deploy/remove the one or more vehicles in the transportation network. In an embodiment, the transportation server 108 may transmit an instruction to at least a computing device installed in the one or more vehicles. In an embodiment, the instruction may correspond to deployment or removal of the vehicles from the transportation network. In an embodiment, the instruction may further include the information pertaining to the location/route that the vehicle may have to traverse in order to meet the demand.

The transportation server 108 may be realized through various types of application servers such as, but not limited to, Java application server, .NET framework application server, and Base4 application server.

In an embodiment, the computing device installed in the one or more vehicles may correspond to a PDA or a tablet that may be connected to the network 110. As discussed, the computing device may receive the instruction from the transportation server 108. Further, the computing device may display the information to an operator of the respective vehicle.

The network 110 corresponds to a medium through which content and messages flow between various devices of the system environment 100 (e.g., the computing device 102, the application server 104, the database server 106, and the transportation server 108). Examples of the network 110 may include, but are not limited to, a Wireless Fidelity (Wi-Fi) network, a Wireless Area Network (WAN), a Local Area Network (LAN), or a Metropolitan Area Network (MAN). Various devices in the system environment 100 can connect to the network 110 in accordance with various wired and wireless communication protocols such as Transmission Control Protocol and Internet Protocol (TCP/IP), User Datagram Protocol (UDP), and 2G, 3G, or 4G communication protocols.

Figure 2:
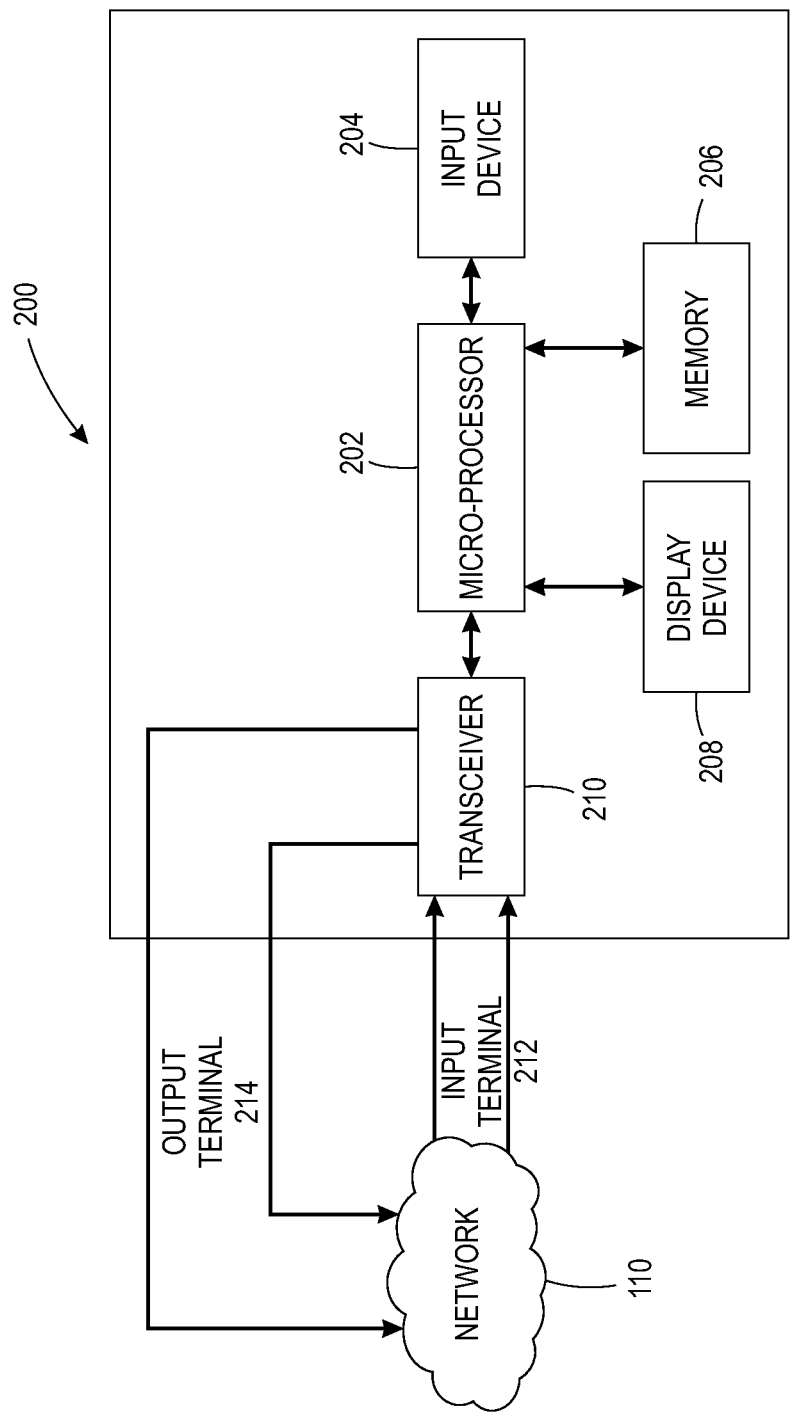
FIG. 2 is a block diagram illustrating a computing device, in accordance with at least one embodiment.

FIG. 2 is a block diagram that illustrates a system 200 for predicting demand of one or more vehicles or for deploying one or more public transit vehicles, in accordance with at least one embodiment. In an embodiment, the system 200 may correspond to at least one of the computing device 102, the application server 104, the database server 106, or the transportation server 108. For the purpose of ongoing description, the system 200 is considered as the application server 104. However, the scope of the disclosure should not be limited to the system 200 as the application server 104. The system 200 may also be realized as the computing device 102, the database server 106, or the transportation server 108.

The system 200 includes a microprocessor 202, an input device 204, a memory 206, a display device 208, a transceiver 210, an input terminal 212, and an output terminal 214. The microprocessor 202 is coupled to the input device 204, the memory 206, the display device 208, and the transceiver 210. The transceiver 210 is connected to the network 110 through the input terminal 212 and the output terminal 214.

The microprocessor 202 includes suitable logic, circuitry, and/or interfaces that are operable to execute one or more instructions stored in the memory 206 to perform predetermined operations. The microprocessor 202 may be implemented using one or more microprocessor technologies known in the art. Examples of the microprocessor 202 include, but are not limited to, an x86 microprocessor, an ARM microprocessor, a Reduced Instruction Set Computing (RISC) microprocessor, an Application-Specific Integrated Circuit (ASIC) microprocessor, a Complex Instruction Set Computing (CISC) microprocessor, or any other microprocessor.

The input device 204 may comprise suitable logic, circuitry, interfaces, and/or code that may be operable to receive an input from the user. The input device 204 may be operable to communicate with the microprocessor 202. Examples of the input devices may include, but are not limited to, a touch screen, a keyboard, a mouse, a joystick, a microphone, a camera, a motion sensor, a light sensor, and/or a docking station.

The memory 206 stores a set of instructions and data. Some of the commonly known memory implementations include, but are not limited to, a random access memory (RAM), a read only memory (ROM), a hard disk drive (HDD), and a secure digital (SD) card. Further, the memory 206 includes the one or more instructions that are executable by the microprocessor 202 to perform specific operations. It is apparent to a person with ordinary skills in the art that the one or more instructions stored in the memory 206 enable the hardware of the system 200 to perform the predetermined operations.

The display device 208 may comprise suitable logic, circuitry, interfaces, and/or code that may be operable to render a display. In an embodiment, the display device 208 may be realized through several known technologies such as, Cathode Ray Tube (CRT) based display, Liquid Crystal Display (LCD), Light Emitting Diode (LED) based display, Organic LED display technology, and Retina display technology. In addition, in an embodiment, the display device 208 may be capable of receiving input from the user. In such a scenario, the display device 208 may be a touch screen that enables the user to provide input. In an embodiment, the touch screen may correspond to at least one of a resistive touch screen, capacitive touch screen, or a thermal touch screen. In an embodiment, the display device 208 may receive input through a virtual keypad, a stylus, a gesture, and/or touch based input.

The transceiver 210 transmits and receives messages and data to/from various components of the system environment 100 (e.g., the computing device 102, the database server 106, and the transportation server 108) over the network 110. Examples of the transceiver 210 may include, but are not limited to, an antenna, an Ethernet port, a USB port, or any other port that can be configured to receive and transmit data. The transceiver 210 transmits and receives data/messages in accordance with the various communication protocols, such as, TCP/IP, UDP, and 2G, 3G, or 4G communication protocols through the output terminal 214 and the input terminal 212, respectively.

Figure 3:
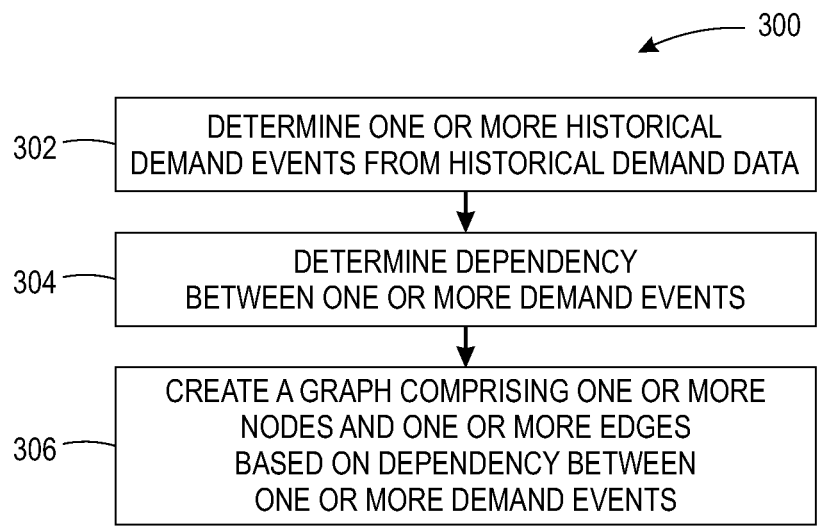
FIG. 3 is a flowchart illustrating a method for creating a graph utilizable to predict demand for one or more vehicles, in accordance with at least one embodiment.

FIG. 3 is a flowchart 300 illustrating a method for creating a graph utilizable to predict demand for one or more vehicles, in accordance with at least one embodiment. The flowchart 300 has been described in conjunction with FIG. 1 and FIG. 2.

At step 302, one or more historical demand events are determined from the historical demand data. In an embodiment, the historical demand data comprises the one or more demand events at each of one or more locations during the plurality of time intervals. In an embodiment, prior to determining the one or more demand events, the microprocessor 202 may receive data pertaining to a sale of one or more tickets for the one or more vehicles at the one or more locations during the plurality of time intervals. In an embodiment, the microprocessor 202 may receive the ticket sales data from the computing device 102 at different locations.

Based on the ticket sales data, the microprocessor 202 may determine the historical demand data. Following Table 1 illustrates the example ticket sales data received from the computing device 102:

TABLE 1

Illustration of the ticket sales data

| Location | No. of ticket sales | Time interval |
|---|---|---|
| Location-1 | 2 | 05:30-06:00 |
| Location-1 | 2 | 06:00-06:30 |
| Location-1 | 3 | 06:30-07:00 |
| Location-2 | 3 | 07:00-07:30 |
| Location-2 | 3 | 07:30-08:00 |
| Location-2 | 4 | 08:00-08:30 |
| Location-2 | 5 | 05:30-06:00 |
| Location-3 | 3 | 06:00-06:30 |
| Location-3 | 4 | 06:30-07:00 |

Thereafter, the microprocessor 202 may determine the one or more historical demand events from the ticket sales data. In an embodiment, the number of ticket sold in the predetermined time interval is directly proportional to the demand of the one or more vehicles during predetermined time interval. Therefore, the microprocessor 202 may utilize the ticket sales data to determine the demand event. For example, the microprocessor may create a demand event as <location-1, 6:30-7:00, 4, 5>. In an embodiment, the microprocessor 202 may assign an id to each demand event such that the id is unique for the location and the time interval of the day. For example, a demand event for a location-1 during the time interval 05:30-06:00 may have an id 1. Similarly, the demand event for the location 2 during the time interval 05:30-06:00 may have an id 2. The information pertaining to a demand event may include, but is not limited to the id, a time interval of the day, a day of the year, and a demand of the one or more vehicles.

It will be apparent to a person having ordinary skill in the art that the data in the Table 1 has been provided only for illustration purposes and should not limit the scope of the disclosure.

A person having ordinary skill in the art would understand that the scope of the disclosure should not be limited to determining the demand event from the ticketing sales data. In an embodiment, the demand event may be determined based on a count of passengers present at a location during a predetermined time interval. In an embodiment, in such a scenario, the count of the passengers may be determined based one or more proximity sensors installed at entry and exits of the bus stop at the one or more locations. Further, the scope of the disclosure is not limited to the sensors. In an embodiment, any image processing technique may be used for determining the count of passengers at a bust stop during any given instance of time.

At step 304, a dependency between the one or more demand events is determined. In an embodiment, the microprocessor 202 may determine the dependency between the one or more demand events. In an embodiment, the microprocessor 202 may determine the dependency using at least a linear regression model. The linear regression model may include, but is not limited to, a Poisson distribution, a lasso regression model, or a penalized lasso regression model.

In an embodiment, the microprocessor 202 may determine the dependency of a demand event on other demand events based on a chronological occurrence of the demand events. For example, if demand events 1, 2, 3 chronologically precede the demand event 4, then demand values in demand event 4 may be dependent on demand values of the demand events 1, 2, 3. Thereafter, the microprocessor 202 may determine a probability distribution of a demand associated with demand event 4 conditioned based on the demand observed in the demand events 1, 2, and 3. In an embodiment, the microprocessor 202 may represent the probability distribution of the demand associated with the demand event 4 as P (a4|a1, a2, a3), where $a_1$, $a_2$, $a_3$, may refer to random variables that correspond to the demand of the demand events 1, 2, and 3, respectively. Thereafter, the microprocessor 202 may model the probability distribution of the demand event (DE) 4 as the Poisson distribution with a log of a mean of the probability distribution of the demand event 4 being a linear combination of demand events 1, 2, and 3. In an embodiment, the microprocessor 202 may utilize below equation to determine the dependency between the demand events:

$$\log(E(a_4|a_1,a_2,a_3,a_0))=m_1a_1+m_2a_2+m_3a_3+m_0; \quad (1)$$

where, $a_1$, $a_2$, $a_3$, $a_4$=Random variables corresponding to demand of the demand events 1, 2, 3, and 4, respectively, $m_1$, $m_2$, $m_3$=Coefficients of regression for the demand events 1, 2, and 3, respectively, $m_0$=Bias term.

In an embodiment, the microprocessor 202 may determine the coefficients of regression for a demand event based on the historical demand data, as discussed above. For example, in an embodiment, the microprocessor 202 may employ the lasso regression on the historical demand data, as disclosed above in the Table 1. For instance, post employing the lasso regression on the historical demand data, the microprocessor 202 may determine that $m_3$=0. Thus, the demand event (DE) 4 may be only dependent on the demand events 1 and 2 and not on demand event 3. Further, the microprocessor 202 may determine that $m_1$=1 and $m_2$=2.2, indicating that there is a dependency value of 1 between DE 4 and DE 1, and a dependency value of 2.2 between DE 4 and DE 2. The dependency value for each of the one or more demand events has been described later in conjunction with the FIG. 5A. In an embodiment, the microprocessor 202 may utilize the historical demand data to obtain a sparse model in which the coefficients of regression may be zero. In an embodiment, the lasso regression may be utilized to obtain the sparse model.

It will be apparent to a person having ordinary skill in the art that the above-mentioned method for determining the dependency has been provided only for illustration purposes and should not limit the scope of the disclosure. For example, in an embodiment, the microprocessor 202 may employ different methods to determine dependency, without departing from the scope of the disclosure. For example, the microprocessor 202 may employ lasso regression with a penalty technique to determine the dependency among the demand events.

In an embodiment, the demand events may be considered as a parent node if the nodes are not dependent on any other nodes in the created graph. Similarly, the other demand events may be considered as a child node if they are dependent on at least one other node in the graph. Typically, in such scenarios, the graph may be acyclic graph as any parent node may precede a child node in time. For example, in an embodiment, the microprocessor 202 may employ penalized lasso regression to determine relevance of a variable $DE_{source}$ in predicting the value of $DE_{target}$. Each demand event may be associated with a time of occurrence (time(DE)), and a stop (stop(DE)) at which the demand may be realized. In an embodiment, the microprocessor 202 may utilize the below equation to determine the penalty function:

$$P_{source;target}=50-(\text{time}(DE_{target})-\text{time}(DE_{source}))+10 \\ [\text{stop}(DE_{target})=\text{stop}(DE_{source})] \quad (2)$$

where, time($DE_{target}$)==time at which the demand event is realized at "target" stop, target, stop($DE_{target}$)=stop($DE_{source}$) implies the demand event condition that the bus stops "target" and "source" are the same.

It can be observed from the equation 2, that the microprocessor 202 may assign a lower penalty to demand events that may have occurred earlier than the target DE. Higher penalty between target station and source station will result in lower weight assigned to the corresponding station.

At step 306, the graph is created. The microprocessor 202 may create the graph based on the dependency of the one or more demand events on each other. In an embodiment, the microprocessor 202 may utilize the determined dependency between the one or more demand events (as discussed in the step 304) to create the graph. The graph may include one or more nodes and one or more edges connecting the one or more nodes. In an embodiment, each of the one or more nodes may be indicative of a demand event from the one or more demand events. Similarly, an edge from the one or more edges, connecting two nodes, may indicate the dependency between two demand events from the one or more demand events. Further, in an embodiment, the microprocessor 202 may assign weights to the one or more edges of the graph. The weights on the one or more edges may indicate a strength of the dependency between the demand events. In an embodiment, the microprocessor 202 may determine weights on the one or more edges by using at least a probabilistic distribution model, or lasso regression model. As discussed above, the microprocessor 202 may employ lasso regression on the historical demand data to determine weights on the one or more edges. For example, as determined above, $m_1=1$ and $m_2=2.2$. Thus, the strength of the dependency between the demand events 1 and 4 (i.e., $m_1$) is less than the strength of the dependency between the demand events 2 and 4 ($m_2$). An example of a graph illustrating the dependency between the one or more demand events has been described later in conjunction with the FIG. 5A.

It will be apparent to a person having ordinary skill in the art that the above-mentioned modelling techniques for creation of the graph have been provided only for illustration purposes and should not limit the scope of the disclosure. For example, in an embodiment, the microprocessor 202 may employ complex techniques such as non-linear regression modelling and factor in other external variables as weather information, demographic information, the day of the week, and other similar variables, without departing from the scope of the disclosure.

Figure 4:
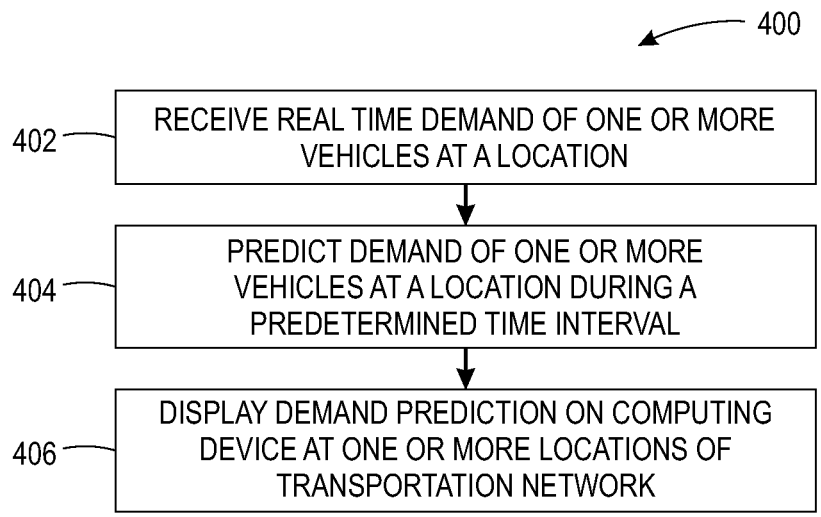
FIG. 4 is a flowchart illustrating a method for predicting demand of one or more vehicles in a transportation network, in accordance with at least one embodiment.

FIG. 4 is a flowchart 400 illustrating a method for predicting demand of one or more vehicles in a transportation network, in accordance with at least one embodiment. The flowchart 400 has been described in conjunction with FIG. 1, FIG. 2, and FIG. 3.

At step 402, a real time demand at one of the one or more locations during a predetermined time period is received from the computing device 102. In an embodiment, the processor 202 may receive the real time demand.

At step 404, the demand of the one or more vehicles at the one or more locations during a predetermined time interval is predicted. The microprocessor 202 may predict the demand of the one or more vehicles. Based on the real time demand and the created graph (as discussed in step 306), the microprocessor 202 may predict the demand of the one or more vehicles at the one or more locations during the predetermined time interval. In an embodiment, the microprocessor 202 may predict the demand of the one or more vehicles based on the weights assigned to each of the one or more edges of the graph. For example, a demand event 1 is dependent on a demand event 2 with a degree of dependency of 2.2. Further, if the real time demand observed during the demand event 2 is '5'. The predicted demand of the one or more vehicles during demand event 1 is "5*2.2", i.e., '11'. The prediction of the demand has been described later in conjunction with FIG. 5B.

In an embodiment, the demand for the one or more vehicles may be predicted based on the count of the passengers. For example, if the count of the passengers is "150", and each vehicle may accommodate "25" passengers. Based on the count, the microprocessor 202 may deploy "6" vehicles to accommodate the "150" passengers.

At step 406, the demand prediction is displayed. In an embodiment, the microprocessor 202 may display the predicted demand on a display device associated with the computing device 102 at one or more locations of a transportation network. For example, in an embodiment, the predicted demand information may result in an updated visualization of the current operating status of the transportation network. The updated visualization has been described later in conjunction with FIG. 6.

Figure 5A:
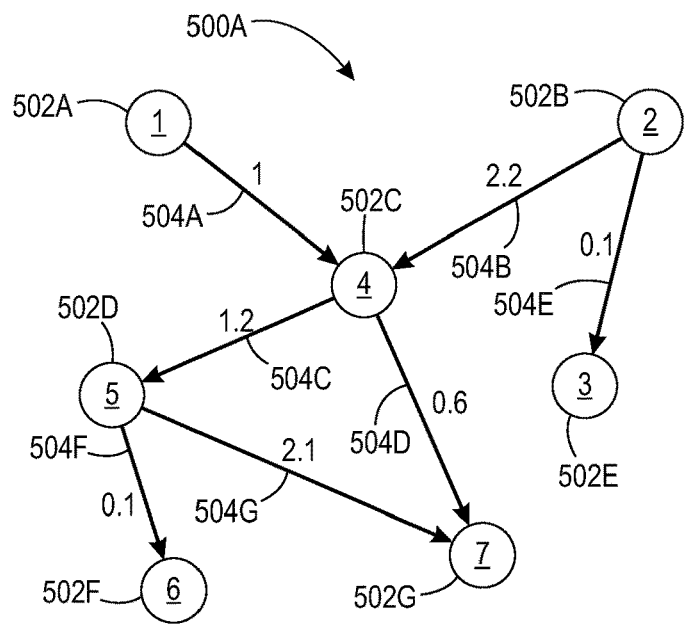
FIG. 5A is a graph illustrating dependency between one or more demand events, in accordance with at least one embodiment.

FIG. 5A is a graph 500A illustrating the dependency between the one or more demand events, in accordance with at least one embodiment. The graphical representation 500A has been described in conjunction with FIG. 1, FIG. 2, and FIG. 3.

As shown in the FIG. 5A, the graph 500A includes one or more nodes (depicted by 502), and the one or more edges (depicted by 504) connecting the one or more nodes 502. Each node (e.g., 502a) may indicate a demand event from the one or more demand events. Similarly, an edge (e.g., 504a) connecting the two nodes (e.g., 502a and 502c) indicates the dependency between the two demand events (e.g., DE 1 and DE 4) from the one or more demand events, as discussed in the FIG. 3. Further, the graph 500A displays the weights assigned to each of the one or more edges 504. As discussed in the FIG. 3, the weights may be assigned to each of the one or more edges 504 to predict the demand of the one or more vehicles at a location from the one or more locations during a predetermined time interval. For example, in the graph 500A, the weight "1" indicates the strength of the dependency between DE 1 (depicted by 502a) and DE 4 (depicted by 502c).

Figure 5B:
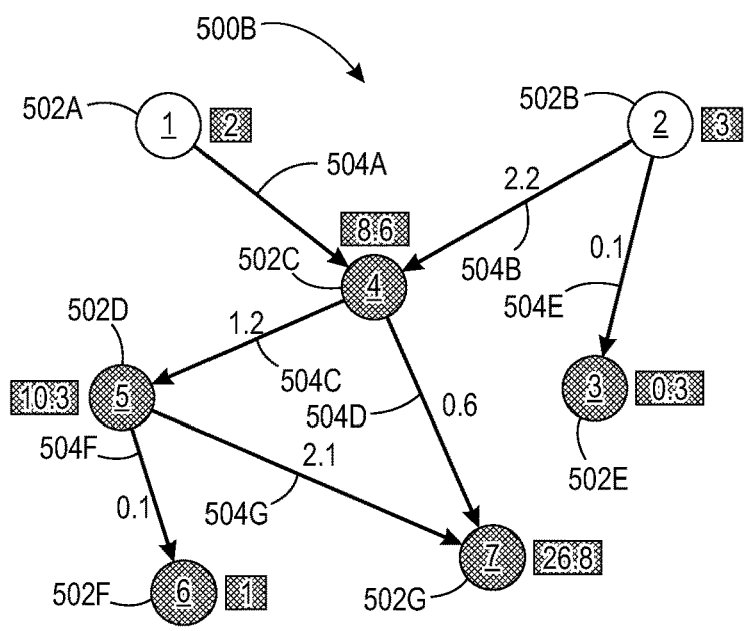
FIG. 5B is a graph illustrating predicted demand of the demand events, in accordance with at least one embodiment.

FIG. 5B is a graph 500B illustrating the predicted demand of the demand events, in accordance with at least one embodiment. The graphical representation 500B has been described in conjunction with FIG. 1, FIG. 2, FIG. 3, and FIG. 4.

As shown in the FIG. 5B, the graph 500B displays the updated graph based on the predicted demand of the one or more vehicles. The predicted demand of the one or more vehicles may be determined based on the original graph 500A (as discussed in the FIG. 5A) and the real time demand of the one or more vehicles observed at a location during a predetermined time interval (hereinafter referred to as real time demand event). For example, the observed demand of the one or more vehicles during the demand event (represented by the node 502a) is "2". Similarly, the observed demand of the one or more vehicles during the demand event (depicted by 502b) is "3". Based on the observed demand of two nodes, the microprocessor 202 may propagate the observed demand throughout the graph 500B to each of the one or more nodes 502 to update the graph 500B. For example, the microprocessor 202 may predict the demand of 8.6 (obtained as 2*1+3*2.2) for the DE 4 (depicted by 502c). Similarly, the microprocessor 202 may determine the predicted demands for each demand event of the graph 500B.

Figure 6:
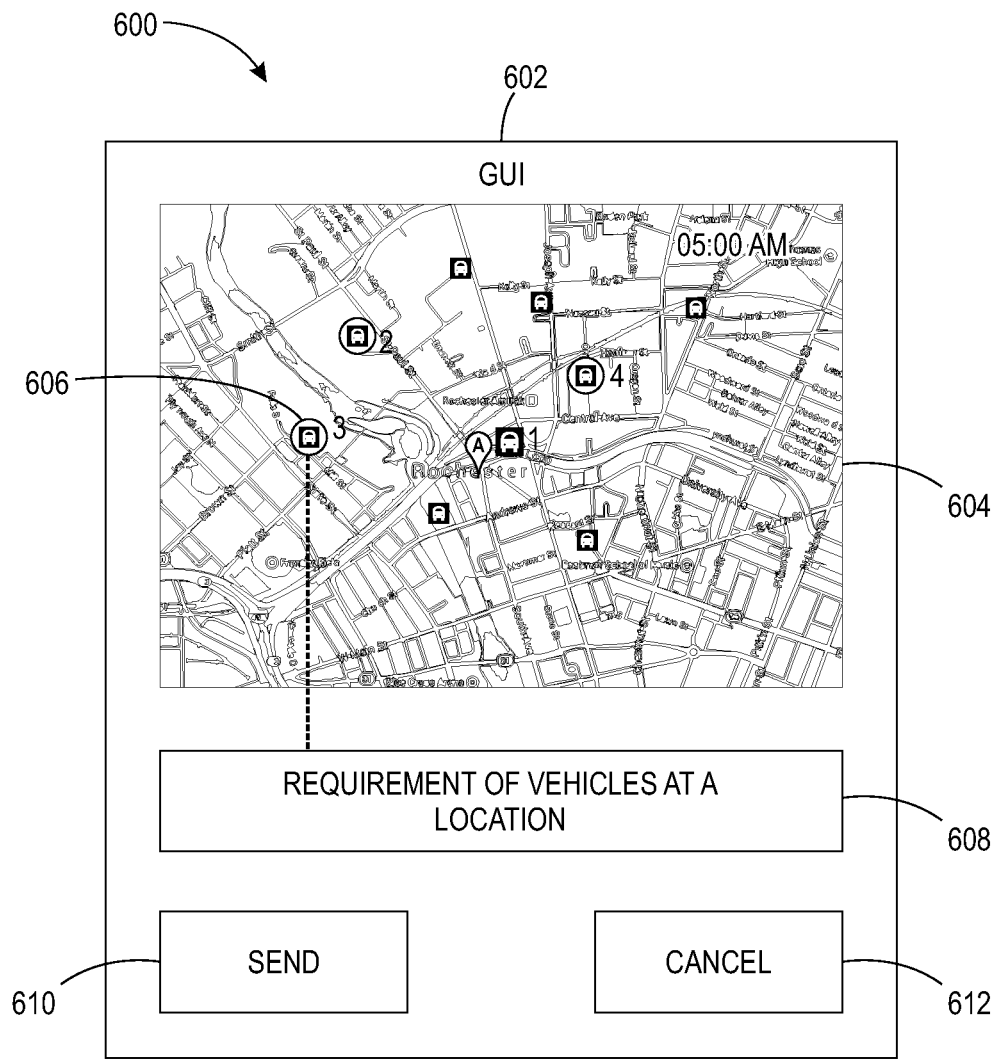
FIG. 6 is a block diagram illustrating a graphical user interface presented to a user, in accordance with at least one embodiment.

FIG. 6 is a block diagram 600 illustrating a graphical user interface presented to a user, in accordance with at least one embodiment. The block diagram 600 has been described in conjunction with FIG. 1, FIG. 2, and FIG. 3.

A graphical user interface, GUI, (depicted by 602) is presented to the transport authorities on a display device associated with the transportation server 108. The GUI 602 includes a graph (depicted by 604). The graph indicates a visual representation of each of one or more locations of the transportation network at a time 5:00 AM. When the transport authorities hover or click on a location (e.g., a bus stop 606), the window 608 is displayed to the transport authorities. The window 608 displays the demand of the one or more vehicles at the location 606 based on the real time demand. The GUI 602 further includes a send button 610 and a cancel button 612. The GUI 602 enables the transport authorities to send (through the send button 610) the predicted demand of the one or more vehicles at the location 606 to computing devices at the location 606 and/or one or more transit vehicles. Alternatively, the transport authorities may close the GUI 602 through the cancel button 612.

Figure 7:
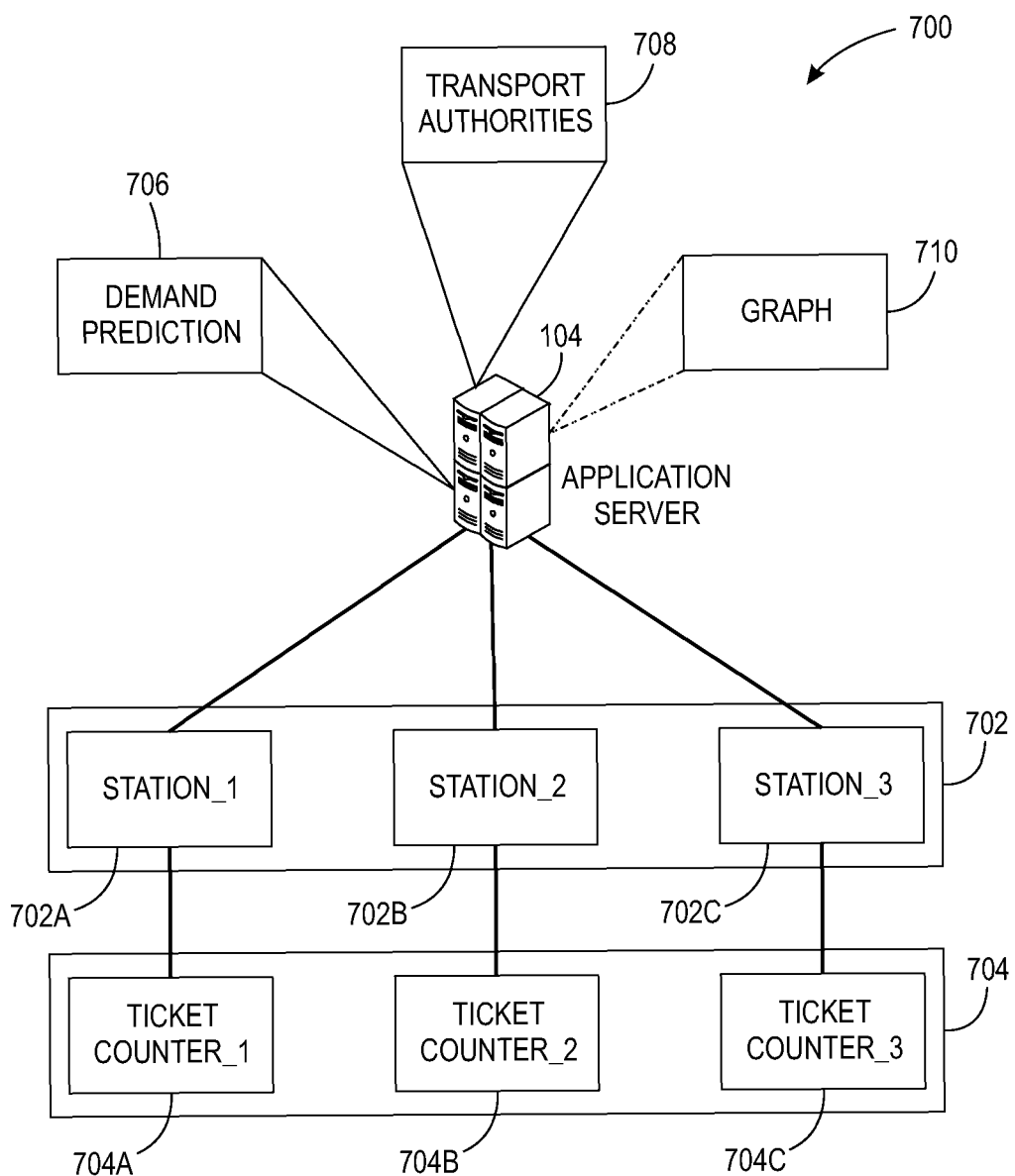
FIG. 7 is a block diagram of another system environment, in which various embodiments can be implemented.

FIG. 7 is a block diagram of another system environment 700, in which various embodiments can be implemented.

The system environment 700 has been described in conjunction with the FIG. 1, FIG. 2, FIG. 3, and FIG. 4.

In the system environment 700, one or more passengers may purchase one or more tickets from ticket counters (depicted by 704) at one or more stations (depicted by 702). For example, 100 passengers may purchase tickets from ticket counter_1 (depicted by 704*a*) at station_1 (depicted by 702*a*) during a time interval 05:30-06:00. Based on a count of sale of tickets, the application server 104 predicts the demand of vehicles at station_1 702*a* during the time interval 06:00-06:30. In an embodiment, the scope of the disclosure is not limited to predicting the demand of the vehicles at station_1 702*a*. In an embodiment, the prediction (depicted by 706) may depend on the dependency of a demand event on the demand event corresponding to the station_1 702*a* in the time interval 05:30-06:00. In an embodiment, the application server 104 may determine the dependency based on the graph (depicted by 710). As discussed in the step 306, the graph 710 is created by the application server 104 based on the historical demand data.

For example, the demand at station_1 702*a* is 100. Further, based on the predicted demand 706, the application server 104 may predict that demand at station_2 (depicted by 702*b*) may be 200 (i.e., 100*2) if 2 is the weight of the edge connecting the nodes depicting station_1 702*a* and station_2 702*b*. Thereafter, the application server 104 may share this predicted demand 706 with transport authorities (depicted by 708). The transport authorities 708 may in turn deploy more vehicles to meet the predicted demand 706. Further, the transport authority 708 may transmit a message to the station_2 702*b* regarding the predicted demand 706. The station_2 702*b* may accordingly make arrangements to handle the predicted demand 706. For example, the station_2 702*b* may open additional ticketing counters 704. Further, the station_2 702*b* may make additional security arrangements. A person having ordinary skill in the art would understand that the scope of the disclosure is not limited to opening additional ticketing counters or making security arrangements. In an embodiment, various other arrangements can be made by to cater to the predicted demand.

The disclosed embodiments encompass numerous advantages. Through various embodiments for predicting demand of the one or more vehicles, it is disclosed that the interactive and real time graph may be generated to predict demand of the one or more vehicles at each of one or more locations during a predetermined time interval. Further, the disclosure provides for generation and dynamic updating of the graph based on the real time demand of the one or more vehicles. This kind of scenario may help a user at one or more locations of the transportation network to analyze the predicted demands for the transportation network, and make alterations in the operation of the transportation network, such as meeting the predicted demand of the one or more vehicles by dispatching one or more vehicles.

In addition, the real time demand data may be used beyond merely providing information related to the current operational status of the transportation network. For example, the predictive delay information may be collected, categorized, and analyzed to produce one or more trend reports that can be used to identify specific areas in the transportation network that are likely to have predictive demands, as well as specific times of the day or days of the week when demands are likely to be predicted.

The disclosed methods and systems, as illustrated in the ongoing description or any of its components, may be embodied in the form of a computer system. Typical examples of a computer system include a general-purpose computer, a programmed microprocessor, a micro-controller, a peripheral integrated circuit element, and other devices, or arrangements of devices that are capable of implementing the steps that constitute the method of the disclosure.

The computer system comprises a computer, an input device, a display unit, and the internet. The computer further comprises a microprocessor. The microprocessor is connected to a communication bus. The computer also includes a memory. The memory may be RAM or ROM. The computer system further comprises a storage device, which may be a HDD or a removable storage drive such as a floppy-disk drive, an optical-disk drive, and the like. The storage device may also be a means for loading computer programs or other instructions onto the computer system. The computer system also includes a communication unit. The communication unit allows the computer to connect to other databases and the internet through an input/output (I/O) interface, allowing the transfer as well as reception of data from other sources. The communication unit may include a modem, an Ethernet card, or other similar devices that enable the computer system to connect to databases and networks, such as, LAN, MAN, WAN, and the internet. The computer system facilitates input from a user through input devices accessible to the system through the I/O interface.

To process input data, the computer system executes a set of instructions stored in one or more storage elements. The storage elements may also hold data or other information, as desired. The storage element may be in the form of an information source or a physical memory element present in the processing machine.

The programmable or computer-readable instructions may include various commands that instruct the processing machine to perform specific tasks, such as steps that constitute the method of the disclosure. The systems and methods described can also be implemented using only software programming or only hardware, or using a varying combination of the two techniques. The disclosure is independent of the programming language and the operating system used in the computers. The instructions for the disclosure can be written in all programming languages, including, but not limited to, 'C', 'C++', 'Visual C++' and 'Visual Basic'. Further, software may be in the form of a collection of separate programs, a program module containing a larger program, or a portion of a program module, as discussed in the ongoing description. The software may also include modular programming in the form of object-oriented programming. The processing of input data by the processing machine may be in response to user commands, the results of previous processing, or from a request made by another processing machine. The disclosure can also be implemented in various operating systems and platforms, including, but not limited to, 'Unix', DOS', 'Android', 'Symbian', and 'Linux'.

The programmable instructions can be stored and transmitted on a computer-readable medium. The disclosure can also be embodied in a computer program product comprising a computer-readable medium, or with any product capable of implementing the above methods and systems, or the numerous possible variations thereof.

Various embodiments of the methods and systems for predicting demand of one or more vehicles in a transportation network have been disclosed. However, it should be apparent to those skilled in the art that modifications in addition to those described are possible without departing from the inventive concepts herein. The embodiments, therefore, are not restrictive, except in the spirit of the disclosure. Moreover, in interpreting the disclosure, all terms should be understood in the broadest possible manner consistent with the context. In particular, the terms "comprises" and "comprising" should be interpreted as referring to elements, components, or steps, in a non-exclusive manner, indicating that the referenced elements, components, or steps may be present, or used, or combined with other elements, components, or steps that are not expressly referenced.

A person with ordinary skills in the art will appreciate that the systems, modules, and sub-modules have been illustrated and explained to serve as examples and should not be considered limiting in any manner. It will be further appreciated that the variants of the above disclosed system elements, modules, and other features and functions, or alternatives thereof, may be combined to create other different systems or applications.

Those skilled in the art will appreciate that any of the aforementioned steps and/or system modules may be suitably replaced, reordered, or removed, and additional steps and/or system modules may be inserted, depending on the needs of a particular application. In addition, the systems of the aforementioned embodiments may be implemented using a wide variety of suitable processes and system modules, and are not limited to any particular computer hardware, software, middleware, firmware, microcode, and the like.

The claims can encompass embodiments for hardware and software, or a combination thereof.

It will be appreciated that variants of the above disclosed, and other features and functions or alternatives thereof, may be combined into many other different systems or applications. Presently unforeseen or unanticipated alternatives, modifications, variations, or improvements therein may be subsequently made by those skilled in the art, which are also intended to be encompassed by the following claims.

What is claimed is:

1. A method for predicting demand of one or more vehicles in a transportation network, said method comprising:
    determining, by one or more microprocessors, one or more demand events at each of one or more locations for one or more time intervals based on a historical demand data associated with each of said one or more locations, wherein said one or more demand events correspond to a demand of said one or more vehicles at said one or more locations during a plurality of time intervals throughout a day based on a count of passengers at a location for entry onto the one or more vehicles, wherein the count of passengers of the location for entry onto the one or more vehicles is determined by one or more proximity sensors installed at an entry or exit point of said location for entry;
    creating, by said one or more microprocessors, a graph comprising one or more nodes, and one or more edges connecting said one or more nodes, each node being representative of a demand event from said one or more demand events, wherein an edge is representative of a dependency between two demand events from said one or more demand events;
    predicting, by said one or more microprocessors, said demand of said one or more vehicles at a location from said one or more locations during a predetermined time interval based on said created graph and a real time demand of said one or more vehicles associated with at least one other demand event;
    instructing, by said one or more processors, the one or more vehicles to leave the transportation network based on the demand prediction;
    displaying, by a display device, said demand prediction on a computing device at said one or more locations of said transportation network; and
    physically removing one or more vehicles from the transportation network in response to the instructing of the one or more vehicles.

2. The method of claim 1 further comprising determining, by said one or more microprocessors, said dependency between said two demand events using at least a linear regression model.

3. The method of claim 2, wherein said linear regression model comprises at least a Poisson distribution, lasso regression model, or penalized lasso regression.

4. The method of claim 1, wherein said historical demand data comprises at least data pertaining to a sale of one or more tickets for said one or more vehicles at said one or more locations for said one or more time intervals.

5. The method of claim 1, wherein said graph corresponds to at least a direct acyclic graph.

6. The method of claim 1 further comprising assigning, by said one or more microprocessors, weights to said one or more edges of said graph, wherein said weights on said one or more edges are indicative of a strength of said dependency.

7. The method of claim 6, wherein said demand is predicted based on said weights assigned to each of said one or more edges in said graph.

8. A system for predicting demand of one or more vehicles in a transportation network, said system comprising:
    one or more microprocessors configured to:
        determine one or more demand events at each of one or more locations for one or more time intervals based on a historical demand data associated with each of said one or more locations, wherein said one or more demand events correspond to a demand of said one or more vehicles at said one or more locations during a plurality of time intervals throughout a day based on a count of passengers at a location for entry onto the one or more vehicles, wherein the count of passengers of the location for entry onto the one or more vehicles is determined by one or more proximity sensors installed at an entry or exit point of said location for entry;
        create a graph comprising one or more nodes, and one or more edges connecting said one or more nodes, each node being representative of a demand event from said one or more demand events, wherein an edge is representative of a dependency between two demand events from said one or more demand events;
        predict said demand of said one or more vehicles at a location from said one or more locations during a predetermined time interval based on said created graph and a real time demand of said one or more vehicles associated with at least one demand event;
        instruct the one or more vehicles to leave the transportation network based on the demand prediction; and
    a display device configured to display said demand prediction on a computing device at said one or more locations of said transportation network; and
    one or more vehicles operated to be removed from the transportation network in response to the instruction of said one or more vehicles based on the demand prediction.

9. The system of claim 8, wherein said one or more microprocessors are further configured to determine said dependency between said two demand events using at least a linear regression model.

10. The system of claim 9, wherein said linear regression model comprises at least a Poisson distribution, lasso regression model, or penalized lasso regression.

11. The system of claim 8, wherein said historical demand data comprises at least data pertaining to a sale of one or more tickets for said one or more vehicles at said one or more locations for said one or more time intervals.

12. The system of claim 8, wherein said graph corresponds to at least a direct acyclic graph.

13. The system of claim 8, wherein said one or more microprocessors are further configured to assign weights to said one or more edges of said graph, wherein said weights on said one or more edges are indicative of a strength of said dependency.

14. The system of claim 13, wherein said demand is predicted based on said weights assigned to each of said one or more edges in said graph.

* * * * *